US008347089B2

(12) United States Patent
Adams et al.

(10) Patent No.: US 8,347,089 B2
(45) Date of Patent: *Jan. 1, 2013

(54) SYSTEM AND METHOD OF INDICATING THE STRENGTH OF ENCRYPTION

(75) Inventors: Neil P. Adams, Waterloo (CA); Michael S. Brown, Waterloo (CA); Herbert A. Little, Waterloo (CA); Michael K. Brown, Peterborough (CA)

(73) Assignee: Research In Motion (TX office), Irving, TX (US)

( * ) Notice: Subject to any disclaimer, the term of this patent is extended or adjusted under 35 U.S.C. 154(b) by 108 days.

This patent is subject to a terminal disclaimer.

(21) Appl. No.: 12/697,955

(22) Filed: Feb. 1, 2010

(65) Prior Publication Data

US 2010/0146270 A1 Jun. 10, 2010

Related U.S. Application Data

(63) Continuation of application No. 10/832,155, filed on Apr. 26, 2004, now Pat. No. 7,657,741.

(60) Provisional application No. 60/494,623, filed on Aug. 12, 2003.

(51) Int. Cl.
*H04L 29/06* (2006.01)

(52) U.S. Cl. ...................................................... 713/166

(58) Field of Classification Search .................... 713/166
See application file for complete search history.

(56) References Cited

U.S. PATENT DOCUMENTS

| 4,868,877 | A | 9/1989 | Fischer |
| 6,185,684 | B1 | 2/2001 | Pravetz et al. |
| 6,389,534 | B1 | 5/2002 | Elgamal et al. |
| 6,513,111 | B2 | 1/2003 | Klimczak et al. |
| 6,721,784 | B1 | 4/2004 | Leonard et al. |
| 6,834,341 | B1 | 12/2004 | Bahl et al. |
| 6,920,564 | B2 | 7/2005 | Decuir |
| 6,931,532 | B1 | 8/2005 | Davis et al. |
| 6,931,597 | B1 | 8/2005 | Prakash |
| 7,085,925 | B2 | 8/2006 | Hanna et al. |
| 7,140,044 | B2 | 11/2006 | Redlich et al. |
| 7,203,845 | B2 | 4/2007 | Sokolic et al. |
| 7,263,607 | B2 | 8/2007 | Ingerman et al. |
| 2002/0169957 | A1 | 11/2002 | Hale et al. |
| 2003/0135751 | A1 | 7/2003 | O'Donnell et al. |
| 2003/0140246 | A1 | 7/2003 | Kammer et al. |
| 2004/0203589 | A1 | 10/2004 | Wang et al. |

FOREIGN PATENT DOCUMENTS

| CA | 2373059 | 12/2000 |
| EP | 1265182 | 12/2002 |
| JP | 10-41934 | 2/1989 |
| JP | 2000-244547 | 9/2000 |
| JP | 2001-308844 | 11/2001 |

(Continued)

OTHER PUBLICATIONS

"U.S. Appl. No. 10/832,155, Office Action mailed Sep. 26, 2007", 11 pgs.

(Continued)

*Primary Examiner* — Jacob Lipman
(74) *Attorney, Agent, or Firm* — Schwegman Lundberg Woessner P.A.

(57) ABSTRACT

A method and system are provided for secure messaging on mobile computing devices. The method and system provide for an indication of a security trust level associated with a security method used with an electronic message.

16 Claims, 5 Drawing Sheets

FOREIGN PATENT DOCUMENTS

| | | |
|---|---|---|
| JP | 2003-6126 | 1/2003 |
| WO | 03/014861 A2 | 2/2003 |
| WO | WO-03014861 A2 | 2/2003 |

OTHER PUBLICATIONS

"Australian Application Serial No. 2004301964, Official Communication dated Sep. 24, 2007", 8 pgs.
"Canadian Application Serial No. 2,534,679, Amendment after Allowance filed Jan. 14, 2011", 1 pg.
"Canadian Application Serial No. 2,534,679, Notice of Allowance mailed Dec. 17, 2010", 1 pg.
"Canadian Application Serial No. 2,534,679, Office Action mailed Nov. 26, 2008", 4 pgs.
"Canadian Application Serial No. 2,534,679, Office Action mailed Sep. 16, 2010", 2 pgs.
"Canadian Application Serial No. 2,534,679, Response filed Nov. 5, 2010 to Office Action mailed Sep. 16, 2010", 4 pgs.
"Canadian Application Serial No. 2,534,679, Response filed May 26, 2009 to Office Action mailed Nov. 26, 2008", 4 pgs.
"Chinese Application Serial No. 200480029933.8, Office Action mailed Feb. 6, 2009", English translation, 12 pgs.
"Chinese Application Serial No. 200480029933.8, Office Action mailed May 27, 2010", English translation, 4 pgs.
"Chinese Application Serial No. 200480029933.8, Response filed Oct. 11, 2010 to Office Action mailed May 27, 2010", with English translation, 13 pgs.
"Chinese Application Serial No. 200480029933.8, Response filed Aug. 20, 2009 to Office Action mailed Feb. 6, 2009", English translation, 2 pgs.
"European Application Serial No. 04729391.5, Office Action mailed Oct. 19, 2006", 8 pgs.
"European Application Serial No. 04729391.5, Response filed Feb. 13, 2008 to Office Action mailed Aug. 13, 2007", 14 pgs.
"European Application Serial No. EP04729391, Office Action mailed Aug. 13, 2007", 7 pgs.
"European Application Serial No. EP04729391, Response to Communication pursuant to Art.96(2) EPC dated Aug. 8, 2007", 21 pgs.
"International Application Serial No. PCT/CA2004/000617, International Search Report mailed Apr. 26, 2004", 1 pg.
"Japanese Application Serial No. 2006-522855, Non Final Office Action mailed Jul. 21, 2009", with English translation, 8 pgs.
"Japanese Application Serial No. 2006-522855, Response filed Feb. 1, 2010 to Non Final Office Action mailed Jul. 21, 2009", with English translation, 11 pgs.
"Korean Application Serial No. 10-2006-7002701, Office Action mailed Mar. 21, 2007", 3 pgs.
"Singapore Application Serial No. 200600893-2, Examination Report dated Jul. 31, 2006", 10 pgs.
Zimmerman P., et al: "PGP Message Exchange Formats" RFC 1991, Aug. 1996, XP002206142.
Ramsdell B.: "RFC 2633: S/MIME Version 3 Message Specification" RFC 2633, Jun. 1999, XP002262227.
Syroid, et al.: "Outlook 2000 in a Nutshell", O'Reilly, Apr. 1, 2000, ISBN: 978-1-56-592704-9.
International Search Report and the Written Opinion of the International Searching Authority, or the Declaration of Application No. PCT/CA2004/000617 of Apr. 26, 2004—11 pgs.
Notice of reasons for rejection issued by the Japanese Patent Office on Jul. 16, 2009 in connection with Japanese Application No. 2006-522855.

SYSTEM AND METHOD OF INDICATING THE STRENGTH OF ENCRYPTION

CROSS-REFERENCE TO RELATED APPLICATION

The present application is a continuation of the U.S. patent application Ser. No. 10/832,155, entitled "System and Method of Indicating the Strength of Encryption," filed on Apr. 26, 2004 now U.S. Pat. No. 7,657,741. The present application and the '155 application claim priority to and the benefit of U.S. Provisional Application No. 60/494,623, entitled "System and Method of Indicating the Strength of Encryption," filed Aug. 12, 2003. All of these are hereby incorporated into the present application by reference.

BACKGROUND

1. Technical Field

The present invention relates generally to the field of secure electronic messaging, and in particular to indicating security message information for a secure message.

2. Description of the Related Art

Messages encrypted according to secure messaging protocols such as Secure Multipurpose Internet Mail Extensions (S/MIME) or Pretty Good Privacy (PGP) among others can be encrypted using different ciphers. There are numerous ciphers available for this purpose, such as Triple Data Encryption Standard (Triple-DES), and Advanced Encryption Standard (AES), among others. Some ciphers are classified as "strong" ciphers, while others are classified as "weak" ciphers. Additionally, the perceived strength of a cipher may change over time, as new cryptanalytic attacks for the cipher are discovered.

When a user receives an encrypted message, the level of trust that the user can place on the validity of the message and the authenticity of the sender depends on the strength of the cipher used for encryption. If a strong cipher is used, the user can be confident that the message was not read by someone or tampered with. The weaker the cipher used, the less confident the user may be regarding the security of the communications channel.

Secure messaging clients, such as email applications for desktop or mobile computing devices, typically indicate details of the cipher used for the received secure message. For instance, the messaging client may indicate that the Triple-DES cipher algorithm was used to encrypt the message. However, indicating the cipher used may not necessarily indicate to the user whether the cipher used is considered to be strong or weak unless the user is well-versed in the area of cryptography. Additionally, different users may have different standards for determining the strength of a cipher and thus they may have differing perceptions regarding whether a particular cipher is "strong" or "weak."

SUMMARY

In accordance with the teachings disclosed herein, methods and systems are provided to indicate strength of encryption of an electronic message. For example, a method can be provided for indicating on an electronic device a security trust level associated with an electronic message. The method includes the step of accessing security-related data associated with the electronic message. Security-related trust categories that are stored on the electronic device are used to determine, based upon the accessed security-related data, which of the security-related trust categories corresponds to the electronic message. A security-related indicator is displayed to a user of the electronic device based upon the determined corresponding security-related trust category.

As another example, a security-level indication system can be provided for an electronic device. Security-related data indicates what type of security has been used for an electronic message. A security-related policy store is configured to store security-related trust categories. A comparator module determines which of the security-related trust categories corresponds to the electronic message by using the security-related data. A security-related indicator is displayed to a user of the electronic device based upon the determined corresponding security-related trust category.

DETAILED DESCRIPTION

Signature and trust status checking may be performed on secure messages that are received by a messaging client on a wireless mobile communication device. A secure message may also be processed in other ways by a message sender or intermediate system between a message sender and a messaging client which receives the secure message. For example, a secure message may be a message that has been signed, encrypted and then signed, or signed and then encrypted by a message sender according to variants of Secure Multipurpose Internet Mail Extensions (S/MIME). A secure message could similarly be encoded, compressed or otherwise processed either before or after being signed. Any such processing of a secure message could be reversed at a message receiver if necessary before signature verification operations are performed.

A messaging client allows a system on which it operates to receive and possibly also send messages. A messaging client may operate on a computer system, a handheld device, or any other system or device with communications capabilities. Many messaging clients also have additional non-messaging functions. A messaging client can include any system capable of sending or receiving messages using any variety of messaging protocols or communication architectures, including, but not limited to, Simple Mail Transfer Protocol (SMTP), Post Office Protocol version 3 (POP3), client-server architecture, or peer-to-peer architecture.

Figure 1:
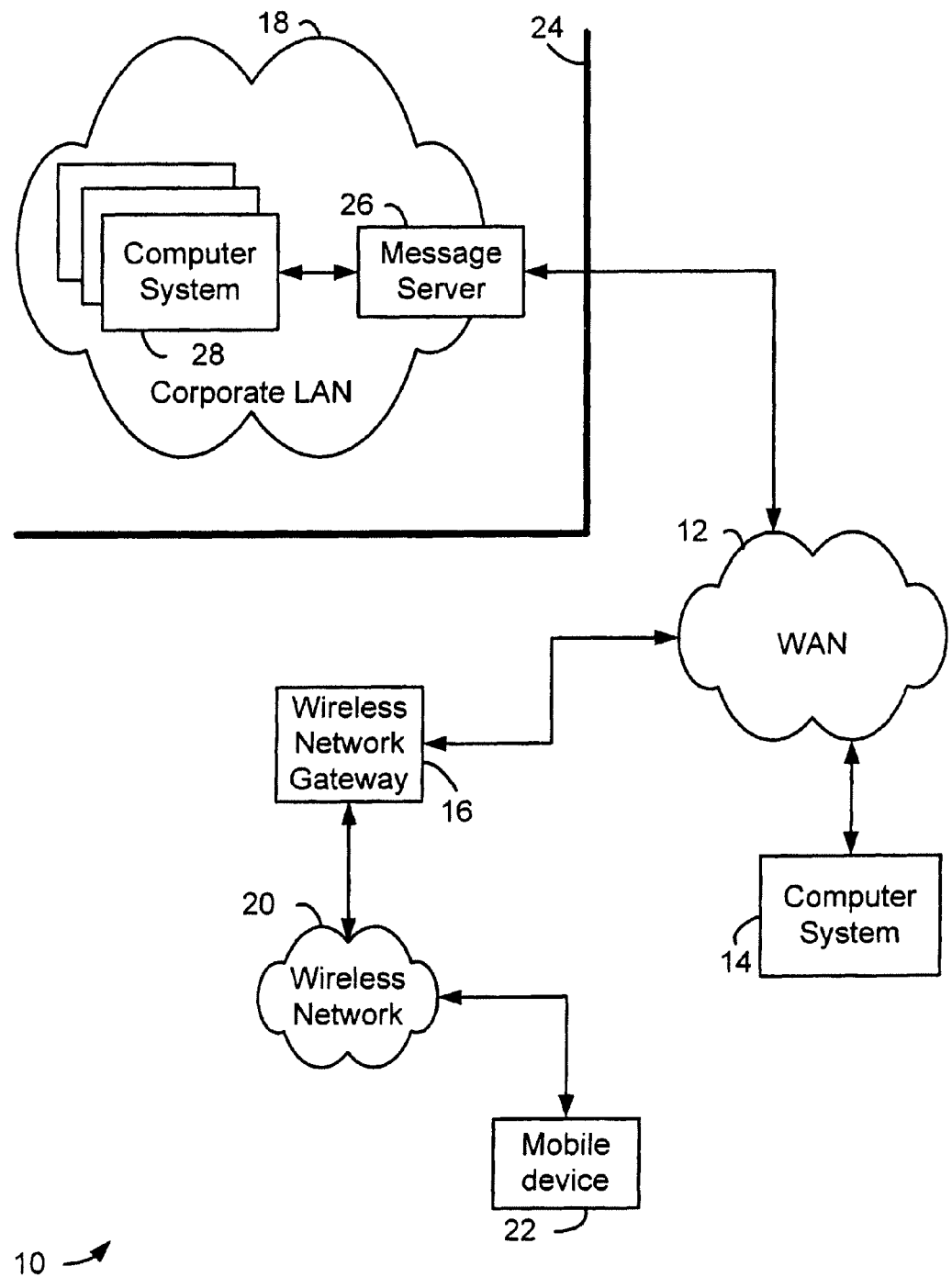
FIG. 1 is a block diagram of an exemplary messaging system in which the present invention may be implemented.

FIG. 1 is a block diagram of an exemplary messaging system in which a messaging client may use the the approaches disclosed herein. The system 10 includes a Wide Area Network (WAN) 12, coupled to a computer system 14, a wireless network gateway 16, and a Local Area Network (LAN) 18. The wireless network gateway 16 is also coupled to a wireless communication network 20, in which a wireless mobile communication device 22 ("mobile device") is configured to operate.

The computer system 14 may be a desktop or laptop personal computer (PC), which is configured to communicate using the WAN 12, which may be the Internet. PCs, such as computer system 14, normally access the Internet through an Internet Service Provider (ISP), an Application Service Provider (ASP), or the like.

The LAN 18 (e.g., a corporate LAN) is an example of a network-based messaging client. It is normally located behind a security firewall 24. Within the LAN 18, a message server 26, operating on a computer behind the firewall 24 serves as the primary interface for users on the LAN 18 to exchange messages both within the LAN 18, and with other external messaging clients via the WAN 12. Two known message servers 26 are Microsoft™ Exchange server and Lotus Domino™ server. These servers 26 are often used in conjunction with Internet mail routers that typically use UNIX-based Sendmail protocols to route and deliver mail messages. The message server 26 may also provide additional functionality, such as dynamic database storage for calendars, to-do lists, task lists, e-mail, electronic documentation, among others.

The message server 26 provides messaging capabilities to networked computer systems 28 coupled to the LAN 18. A typical LAN 18 includes multiple computer systems 28, each of which implements a messaging client, such as Microsoft Outlook™, Lotus Notes, etc. Within the LAN 18, messages are received by the message server 26, distributed to the appropriate mailboxes for user accounts addressed in the received message, and are then accessed by a user through a computer system 28 operating as a messaging client.

The wireless network gateway 16 provides an interface to a wireless network 20, through which messages may be exchanged with a mobile device 22. Such functions as addressing of the mobile device 22, encoding or otherwise transforming messages for wireless transmission, and any other required interface functions may be performed by the wireless network gateway 16. The wireless network gateway 16 may be configured to operate with more than one wireless network 20, in which case the wireless network gateway 16 may also determine a most likely network for locating a given mobile device user and may also track users as they roam between countries or networks.

Any computer system 14, 28 with access to the WAN 12 may exchange messages with a mobile device 22 through the wireless network gateway 16. Alternatively, private wireless network gateways, such as wireless Virtual Private Network (VPN) routers could also be implemented to provide a private interface to a wireless network. For example, a wireless VPN implemented in the LAN 18 may provide a private interface from the LAN 18 to one or more mobile devices 22 through the wireless network 20. Such a private interface to mobile devices 22 via the wireless network gateway 16 and/or the wireless network 20 may also effectively be extended to entities outside the LAN 18 by providing a message forwarding or redirection system that operates with the message server 26. Such a redirection system is disclosed in U.S. Pat. No. 6,219,694, which is hereby incorporated into this application by reference. In this type of redirection system, incoming messages received by the message server 26 and addressed to a user of a mobile device 22 are sent through the wireless network interface, either a wireless VPN router, wireless gateway 16 or other interface, to the wireless network 20 and to the user's mobile device 22. Another alternate interface to a user's mailbox on a message server 26 may be a Wireless Application Protocol (WAP) gateway. Through a WAP gateway, a list of messages in a user's mailbox on the message server 26, and possibly each message or a portion of each message, could be sent to the mobile device 22.

A wireless network 20 normally delivers messages to and from mobile devices 22 via RF transmissions between base stations and mobile devices 22. The wireless network 20 may for example be: (1) a data-centric wireless network, (2) a voice-centric wireless network, or (3) a dual-mode network capable of supporting both voice and data communications over the same infrastructure. Recently developed wireless networks include: (1) the Code Division Multiple Access (CDMA) network, (2) the Groupe Special Mobile or the Global System for Mobile Communications (GSM) and the General Packet Radio Service (GPRS) networks, both developed by the standards committee of CEPT, and (3) third-generation (3G) networks, such as Enhanced Data rates for Global Evolution (EDGE) and Universal Mobile Telecommunications Systems (UMTS), which are currently under development.

GPRS is a data overlay on top of the existing GSM wireless network, which is used in many parts of the world. Examples of data-centric networks include: (1) the Mobitex™ Radio Network ("Mobitex"), and (2) the DataTAC™ Radio Network ("DataTAC"). Examples of known voice-centric data networks include Personal Communication Systems (PCS) networks like CDMA, GSM, and Time Division Multiple Access (TDMA) systems that have been available in North America and world-wide for nearly 10 years. The mobile device 22 may be a data communication device, a voice communication device, or a multiple-mode device capable of voice, data and other types of communications.

Perhaps the most common type of messaging currently in use is electronic mail ("e-mail"). In a standard e-mail system, an e-mail message is sent by an e-mail sender, possibly through a message server and/or a service provider system, and may then be routed through the Internet to one or more message receivers. E-mail messages are normally sent using unencrypted, plain text that can be read or altered by third parties interposed between the e-mail sender and the e-mail receivers (e.g., "in the clear") and typically use Simple Mail Transfer Protocol (SMTP) headers and Multi-purpose Internet Mail Extensions (MIME) body parts to define the format of the e-mail message.

In recent years, secure messaging techniques have evolved to protect both the content and integrity of messages, such as e-mail messages. S/MIME and Pretty Good Privacy™ (PGP™) are two public key secure e-mail messaging protocols that provide for both encryption, to protect data content, and signing, which protects the integrity of a message and provides for sender authentication by a message receiver. In addition to utilizing digital signatures and possibly encryption, secure messages may also or instead be encoded, compressed or otherwise processed.

Figure 2:
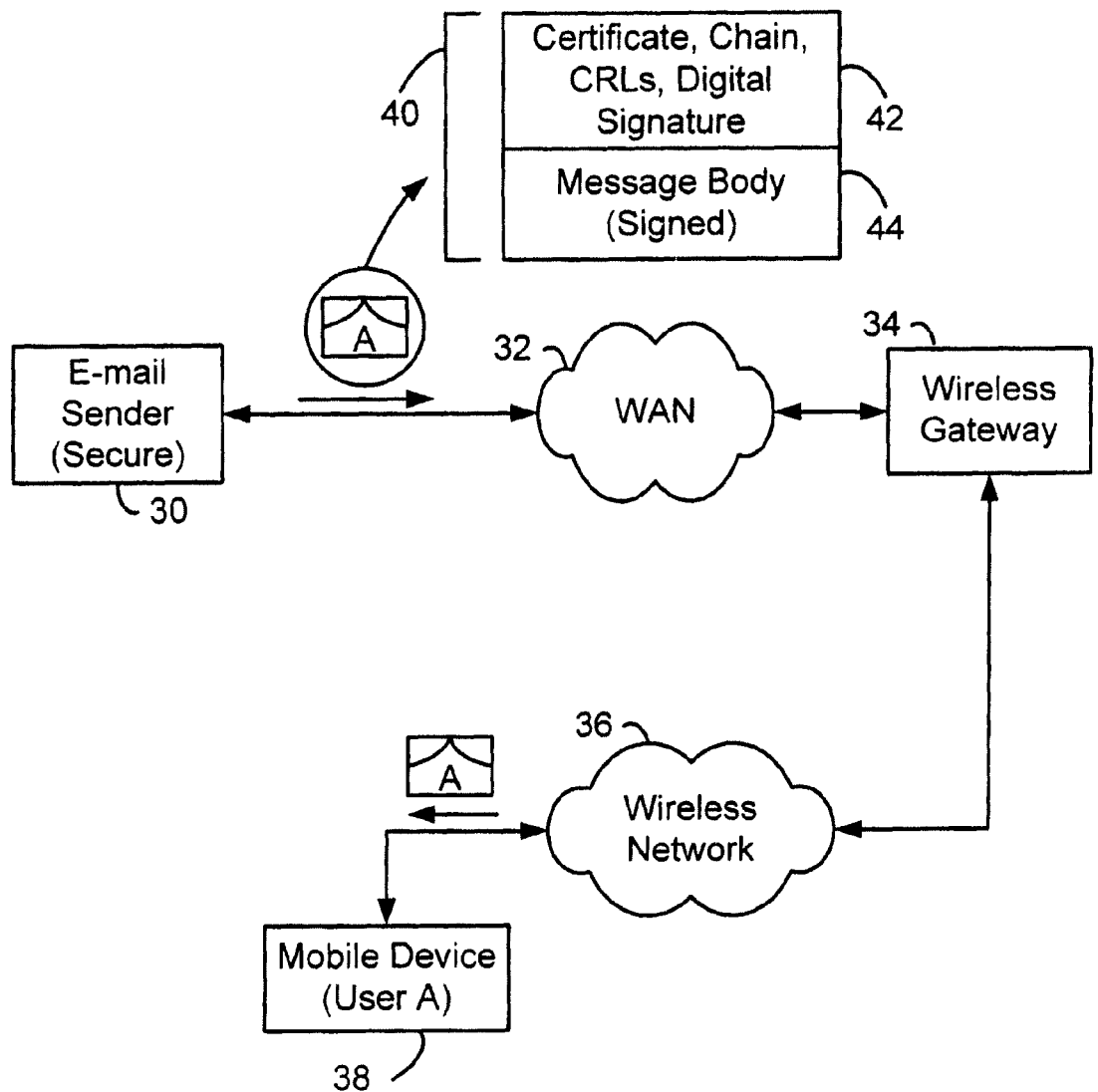
FIG. 2 is a block diagram illustrating a secure e-mail message exchange in a messaging system.

FIG. 2 is a block diagram illustrating a secure e-mail message exchange in a messaging system. The system includes an e-mail sender 30, coupled to a WAN 32, and a wireless gateway 34, which provides an interface between the WAN 32 and a wireless network 36. A mobile device 38 is adapted to operate within the wireless network 36.

The e-mail sender 30 may be a PC, such as the system 14 in FIG. 1, or it may be a network-connected computer, such as computer 28 in FIG. 1. The e-mail sender 30 may also be a mobile device like mobile device 22 in FIG. 1 on which e-mail messages may be composed and sent. The WAN 32, wireless gateway 34, wireless network 36 and mobile device 38 are substantially the same as similarly-labelled components in FIG. 1.

A secure e-mail message sender 30 typically signs a message by taking a digest of the message and signing the digest using the sender's private key. A digest may for example be generated by performing a check-sum, a Cyclic Redundancy Check (CRC), or some other non-reversible operation, such as a hash on the message. This digest of the message is then digitally signed by the sender using the sender's private key. The private key may be used to perform an encryption or some other transformation operation on the digest to generate a digest signature. A digital signature, including the digest and the digest signature, is then appended to the outgoing message. In addition, a digital Certificate of the sender, which includes the sender's public key and sender identity information that is bound to the public key with one or more digital signatures, and possibly any chained Certificates and Certificate Revocation Lists (CRLs) associated with the Certificate may also be included with the outgoing message.

The secure e-mail message 40 sent by the e-mail sender 30 may include a component 42 including the sender's Certificate, Certificate chain, CRLs and digital signature and the signed message body 44. In the S/MIME secure messaging technique, Certificates, CRLs and digital signatures are normally placed at the beginning of a message as shown in FIG. 2, and the message body is included in a file attachment. Messages generated by other secure messaging schemes may place message components in a different order than shown or include additional and/or different components. For example, a signed message 40 may include addressing information, such as "To:" and "From:" email addresses, and other header information.

When the secure e-mail message 40 is sent from the e-mail sender 30, it is routed through the WAN 32 to the wireless gateway 34. As described above, the e-mail sender 30 may send the message 40 directly to a wireless gateway 34, or the message may instead be delivered to a computer system associated with the mobile device 38 and then sent to the mobile device 38 through the wireless gateway 34. Alternatively, the message may be routed or redirected to the mobile device 38 through the wireless network 36 via a wireless VPN router.

In known secure messaging clients, details of the cipher used to encrypt the secure e-mail message 40 are provided to the user. For example, the messaging client may indicate that the message body 44 was encrypted using the Triple-DES cipher. However, it is generally difficult for the device's user to determine the relative reliability or trust provided by use of the cipher based on just knowledge of the specific cipher used in the encryption.

As disclosed herein, a secure messaging client on the mobile device 38 may provide the user with an easy-to-understand indication of the security trust level provided by the cipher used to encrypt the received secure message. This indication is provided in addition to details of the cipher used. The secure messaging client is not limited to receiving secure e-mail messages, and may also receive insecure (e.g., unsecure) e-mail messages. When the secure messaging client receives an insecure email, it may provide an indicator to the user informing the user that no cipher was used with the message.

Figure 3:
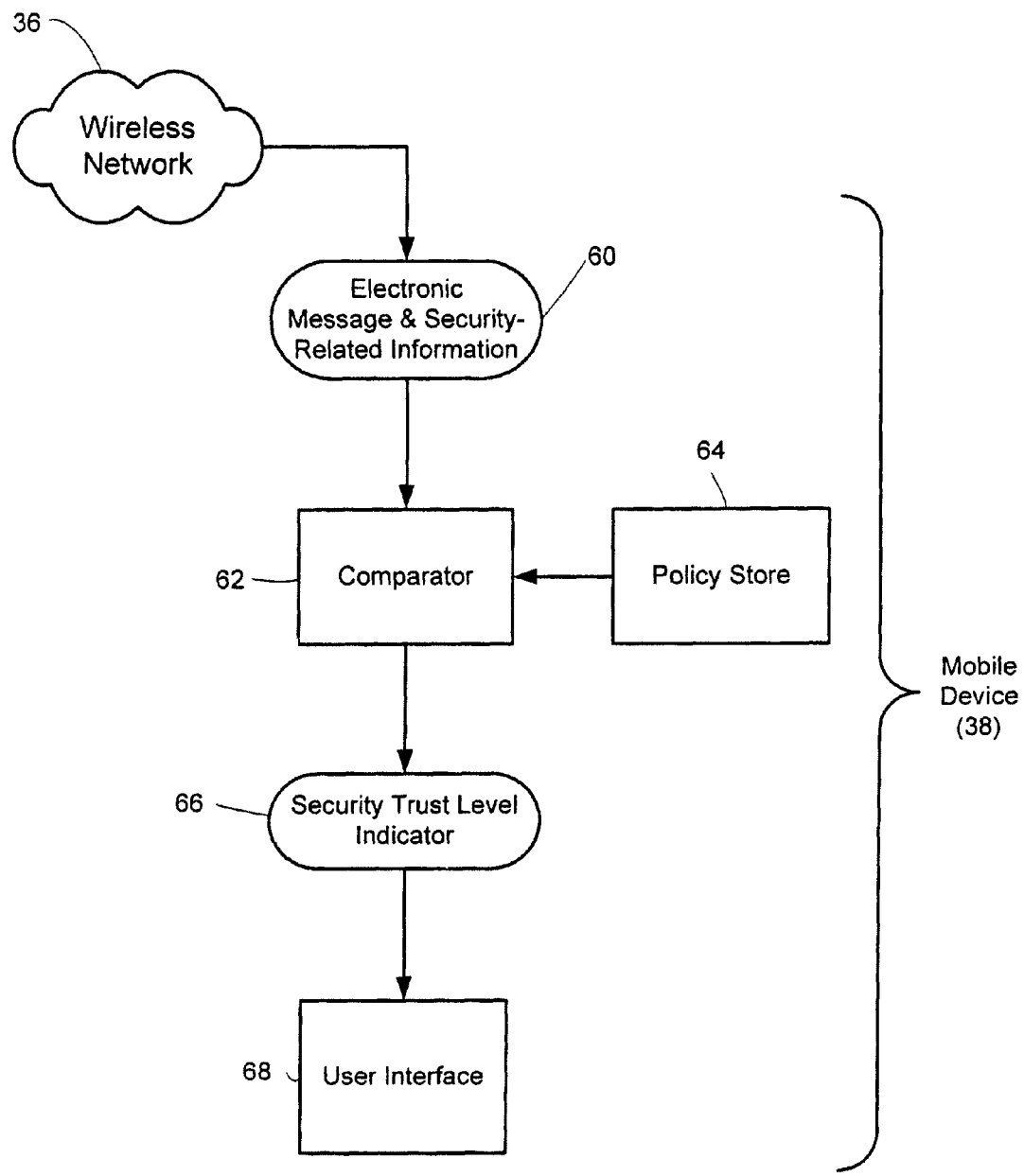
FIG. 3 is a block diagram illustrating a system for indicating security information to a user of the device.

FIG. 3 illustrates the generation of security trust level indicators (e.g., reliability) on a mobile device 38. In the example of FIG. 3, an electronic message 60 (e.g., e-mail) is sent to the mobile device 38 by use of wireless network 36. As explained above, electronic message 60 may be secured by a variety of methods and transmitted along with associated security-related data such as a digital signature or certificate chain (as depicted in FIG. 2). It is possible for security-related data associated with electronic message 60 to be sent separately from the electronic message 60.

When the secure messaging client on the mobile device 38 receives an electronic e-mail message and its associated security-related data 60, the client proceeds to decrypt the message and verify the identity of the sender using known techniques. The client determines the security trust level or reliability strength of the cipher used by referring to a policy store 64 on mobile device 38. Policy store 64 contains relevant details of available ciphers and their respective security-related trust categories. The client can invoke a comparator module 62 to perform a comparison between the message's security-related data and the information stored in the policy store 64. Based upon the comparison, a corresponding security trust level or category is determined for the message. An indicator 66 of the corresponding security trust level is provided to the device's user interface 68.

As an example, if the cipher used to encrypt the message 60 is classified in the policy store 64 as a "weak" cipher, then the user is presented with an indication that the cipher is classified as "weak." As different users or organizations may have different standards used to determine the security trust level provided by ciphers, the policy store 64 allows an information technology (IT) administrator to store categories for known ciphers based on relevant standards. These categories will typically be referred to as cipher policies. For instance, the IT administrator for a government agency may prescribe more stringent tests for a cipher, while the IT administrator for a corporate agency may prescribe less stringent tests. This may lead to a cipher being classified as "weak" by the government agency, but as "strong" by the corporate agency. These cipher policies may be deployed "over the air" to the mobile device 38 through the wireless network 36 allowing the mobile device 38 to always maintain an up-to-date set of cipher policies. Cipher polices deployed through the wireless network 36 by the IT administrator, may be used to update the policy store 64 of the device 38.

Figure 4:
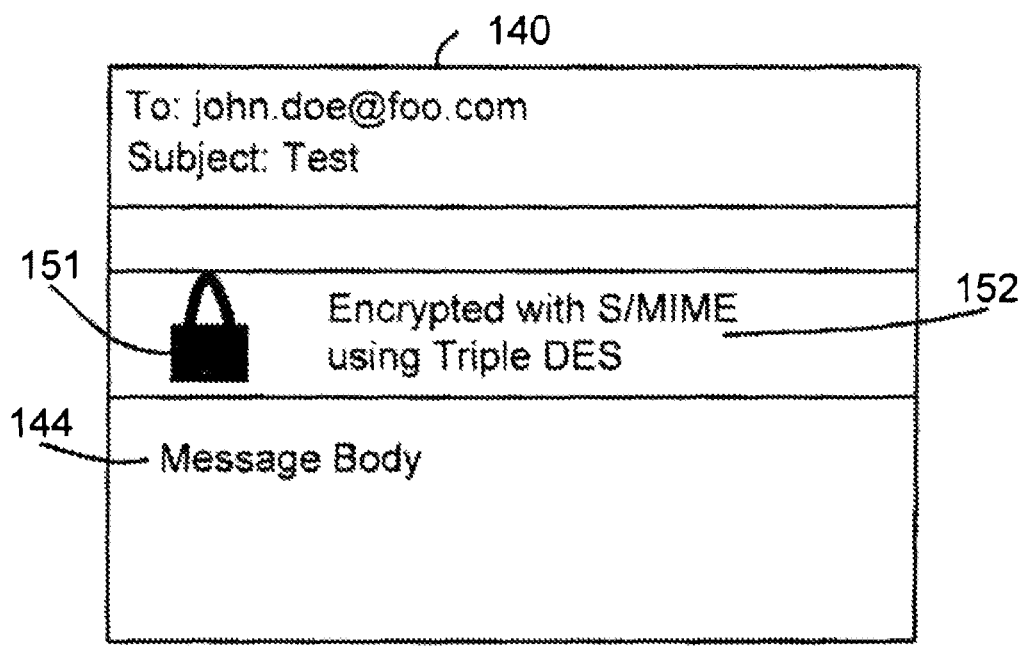
FIG. 4 is a sample screen of a device showing a message that was encrypted using "strong" encryption.

In the example, ciphers are classified as being either "weak" or "strong". Any number of alternate categories may also be used as needed. FIG. 4 shows an example screen of the mobile device 38. In this case, the message 140 was encrypted using a "strong" cipher. A lock icon 151 indicates that the message 140 was encrypted, while an encryption indication message 152 indicates the secure messaging protocol (S/MIME) and the cipher (Triple-DES) were used. For example, the encryption indication message 152 could be "Encrypted using S/MIME using Triple-DES cipher" or any other similar message. As shown in FIG. 4, message 152 can be configured to indicate to the user that a strong cipher was used.

Figure 5:
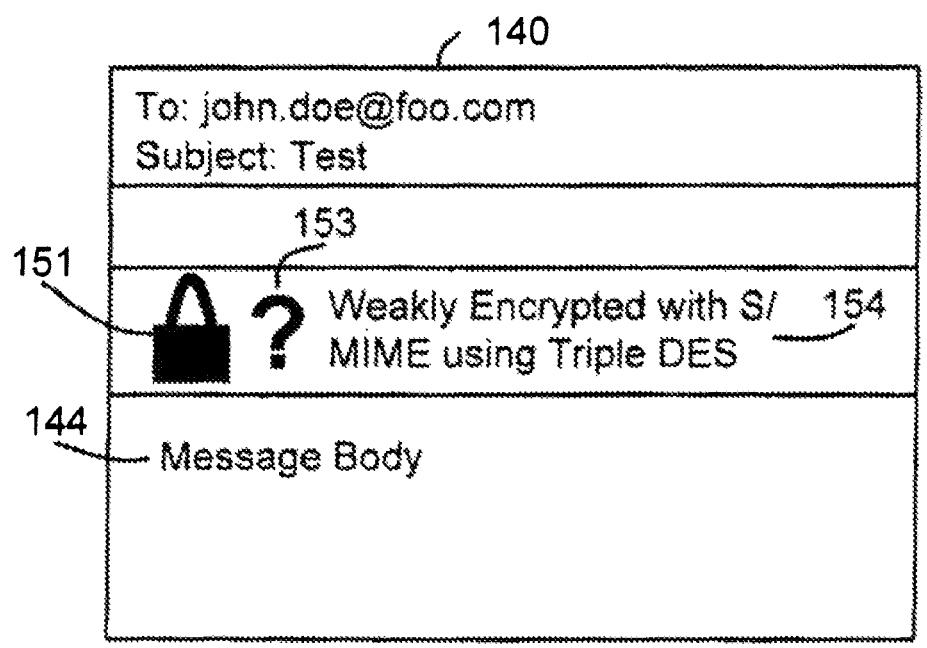
FIG. 5 is a sample screen of a device showing a message that was encrypted using "weak" encryption.

As another example, FIG. 5 shows a screen demonstrating a sample message shown to the user in the case that the cipher used to encrypt the message 140 was classified as weak. In the example, the lock icon 151 indicates to the user, that the message 140 was an encrypted message, while the question mark 153 may indicate that a "weak" cipher was used. Additionally, the encryption indication message 154 could be "Weakly encrypted using S/MIME using Triple-DES cipher" or a similar message. In both example cases, the user may select the lock icon 151 to request details of the secure message protocol and the cipher used. Alternatively, the user may request additional details from a menu provided to the user. As a result, the user may know whether the message 140 was encrypted using a "strong" or a "weak" cipher or some other category of ciphers based on a cipher policy determined by their administrator.

The systems and methods disclosed herein are presented only by way of example and are not meant to limit the scope of the invention. Other variations of the systems and methods described above will be apparent to those skilled in the art and as such are considered to be within the scope of the invention.

For example, the systems and methods may utilize data signals that are transmitted using a communication channel (e.g., a wireless network, Internet, etc.) and that contain messages and their associated security-related data. The data signals may be formatted in many different ways depending upon the implementation environment, such as as packetized data for transmission on a carrier wave across a network. As another example, computer-readable medium (e.g., volatile memory, non-volatile storage, CDs, diskettes, etc.) can store computer instructions and data that perform one or more of the methods disclosed herein. As a further example, various icons and/or text messages may be used as the security-related indicators.

Figure 6:
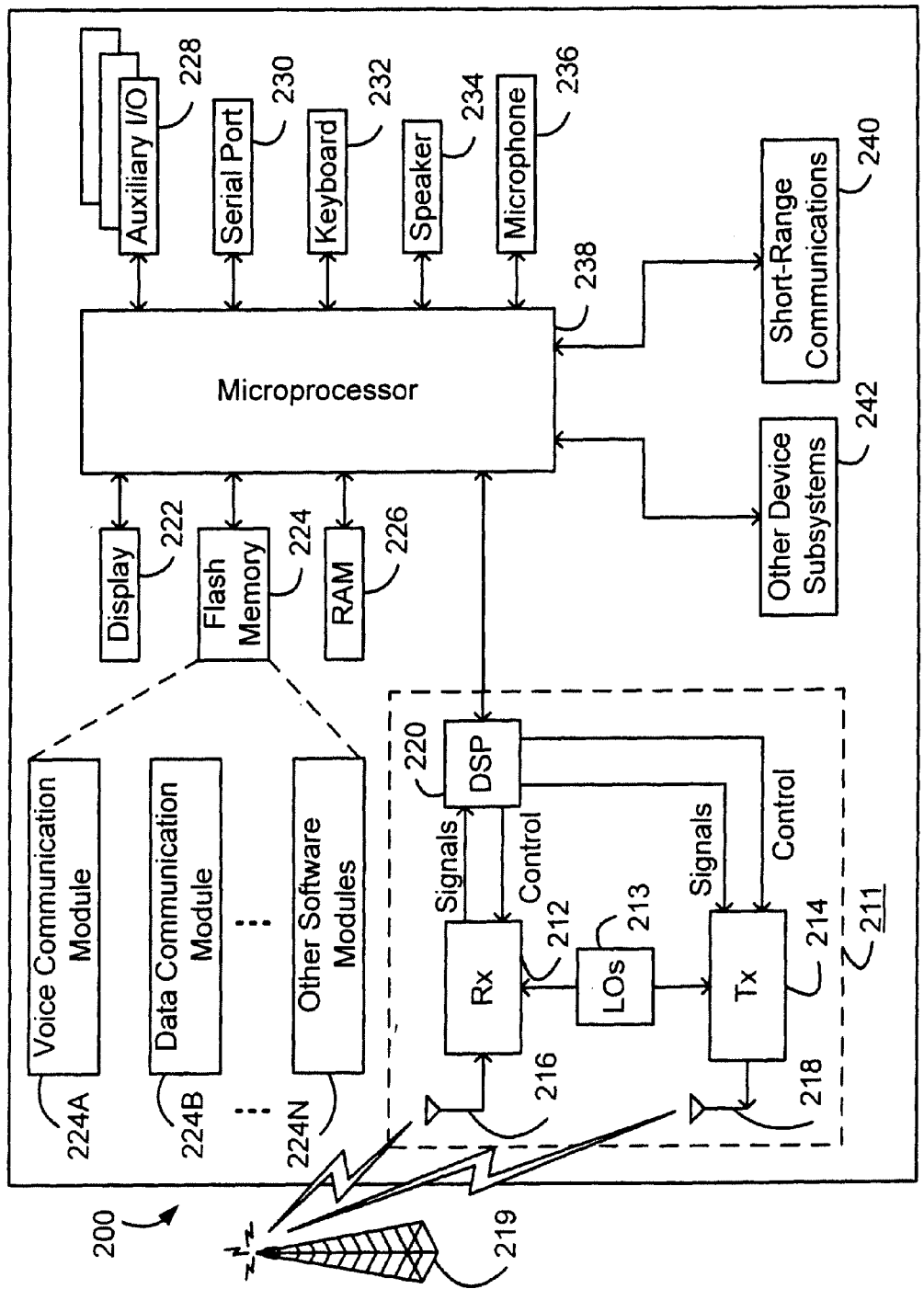
FIG. 6 is a block diagram of a wireless mobile communication device on which a messaging client can use the security level indication systems and methods disclosed herein.

Still further, the systems and methods disclosed herein may be used with many different types of mobile devices. As an illustration, FIG. 6 is a block diagram of a wireless mobile communication device on which a messaging client may use the systems and methods disclosed herein. The mobile device 200 may be a two-way communication device having at least voice and data communication capabilities. The device 200 may have the capability to communicate with other computer systems on the Internet. Depending on the functionality provided by the device 200, the device 200 may be referred to as a data messaging device, a two-way pager, a cellular telephone with data messaging capabilities, a wireless Internet appliance or a data communication device (with or without telephony capabilities).

The dual-mode device 200 includes a transceiver 211, a microprocessor 238, a display 222, Flash memory 224, RAM 226, auxiliary input/output (I/O) devices 228, a serial port 230, a keyboard 232, a speaker 234, a microphone 236, a short-range wireless communications sub-system 240, and may also include other device sub-systems 242. The transceiver 211 may include transmit and receive antennas 216, 218, a receiver (Rx) 212, a transmitter (Tx) 214, one or more local oscillators (LOs) 213, and a digital signal processor (DSP) 220. Within the Flash memory 224, the device 200 may include a plurality of software modules 224A-224N that can be executed by the microprocessor 238 (and/or the DSP 220), including a voice communication module 224A, a data communication module 224B, and a plurality of other operational modules 224N for carrying out a plurality of other functions.

The wireless mobile communication device 200 may be a two-way communication device having voice and data communication capabilities. Thus, for example, the device may communicate over a voice network, such as any of the analog or digital cellular networks, and may also communicate over a data network. The voice and data networks are depicted in FIG. 6 by the communication tower 219. These voice and data networks may be separate communication networks using separate infrastructure, such as base stations, network controllers, etc., or they may be integrated into a single wireless network.

The communication subsystem 211 is used to communicate with the network 219. The DSP 220 is used to send and receive communication signals to and from the transmitter 214 and receiver 212, and may also exchange control information with the transmitter 214 and receiver 212. If the voice and data communications occur at a single frequency, or closely-spaced set of frequencies, then a single LO 213 may be used in conjunction with the transmitter 214 and receiver 212. Alternatively, if different frequencies are utilized for voice communications versus data communications, then a plurality of LOs 213 can be used to generate a plurality of frequencies corresponding to the network 219. Although two antennas 216, 218 are depicted in FIG. 6, the mobile device 200 could be used with a single antenna structure. Information, which includes both voice and data information, is communicated to and from the communication module 211 via a link between the DSP 220 and the microprocessor 238.

The detailed design of the communication subsystem 211, such as frequency band, component selection, power level, etc., will be dependent upon the communication network 219 in which the mobile device 200 is intended to operate. For example, a mobile device 200 intended to operate in a North American market may include a communication subsystem 211 designed to operate with the Mobitex or DataTAC mobile data communication networks and also designed to operated with any of a variety of voice communication networks, such as AMPS, TDMA, CDMA, PCS, etc., whereas a mobile device 200 intended for use in Europe may be configured to operate with the GPRS data communication network and the GSM voice communication network. Other types of data and voice networks, both separate and integrated, may also be utilized with the mobile device 200.

Depending upon the type of network 219, the access requirements for the dual-mode mobile device 200 may also vary. For example, in the Mobitex and DataTAC data networks, mobile devices are registered on the network using a unique identification number associated with each device. In GPRS data networks, however, network access is associated with a subscriber or user of a mobile device 200. A GPRS device typically requires a subscriber identity module ("SIM"), which is required in order to operate the mobile device 200 on a GPRS network. Local or non-network communication functions (if any) may be operable, without the SIM, but the mobile device 200 will be unable to carry out any functions involving communications over the network 219, other than any legally required operations, such as '911' emergency calling.

After any required network registration or activation procedures have been completed, the mobile device 200 may send and receive communication signals, that may include both voice and data signals, over the network 219. Signals received by the antenna 216 from the communication network 219 are routed to the receiver 212, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 220. In a similar manner, signals to be transmitted to the network 219 are processed, including modulation and encoding, for example, by the DSP 220 and are then provided to the transmitter 214 for digital to analog conversion, frequency up conversion, filtering, amplification and transmission to the communication network 219 via the antenna 218. Although a single transceiver 211 is shown in FIG. 6 for both voice and data communications, the mobile device 200 may include two distinct transceivers, a first transceiver for transmitting and receiving voice signals, and a second transceiver for transmitting and receiving data signals.

In addition to processing the communication signals, the DSP 220 may also provide for receiver and transmitter control. For example, the gain levels applied to communication signals in the receiver 212 and transmitter 214 may be adaptively controlled through automatic gain control algorithms implemented in the DSP 220. Other transceiver control algorithms could also be implemented in the DSP 220 in order to provide more sophisticated control of the transceiver 211.

The microprocessor 238 may manage and control the overall operation of the mobile device 200. Many types of microprocessors or microcontrollers could be used for this part, or, alternatively, a single DSP 220 could be used to carry out the functions of the microprocessor 238. Low-level communication functions, including at least data and voice communications, are performed through the DSP 220 in the transceiver 211. Other, high-level communication applications, such as a voice communication application 224A, and a data communication application 224B may be stored in the Flash memory 224 for execution by the microprocessor 238. For example, the voice communication module 224A may provide a high-level user interface operable to transmit and receive voice calls between the mobile device 200 and a plurality of other voice devices via the network 219. Similarly, the data communication module 224B may provide a high-level user interface operable for sending and receiving data, such as e-mail messages, files, organizer information, short text messages, etc., between the mobile device 200 and a plurality of other data devices via the network 219. On the mobile device 200, a secure messaging software application may operate in conjunction with the data communication module 224B in order to implement the signature and trust verification techniques described above.

The microprocessor 238 also interacts with other device subsystems, such as the display 222, Flash memory 224, random access memory (RAM) 226, auxiliary input/output (I/O) subsystems 228, serial port 230, keyboard 232, speaker 234, microphone 236, a short-range communications subsystem 240 and any other device subsystems generally designated as 242. For example, the modules 224A-N are executed by the microprocessor 238 and may provide a high-level interface between a user of the mobile device and the mobile device. This interface typically includes a graphical component provided through the display 222, and an input/output component provided through the auxiliary I/O 228, keyboard 232, speaker 234, or microphone 236.

Some of the subsystems shown in FIG. 6 perform communication-related functions, whereas other subsystems may provide "resident" or on-device functions. Notably, some subsystems, such as keyboard 232 and display 222 may be used for both communication-related functions, such as entering a text message for transmission over a data communication network, and device-resident functions such as a calculator or task list or other PDA type functions.

Operating system software used by the microprocessor 238 may be stored in a persistent store such as Flash memory 224. In addition to the operating system and communication modules 224A-N, the Flash memory 224 may also include a file system for storing data. A storage area may also be provided in the Flash memory 224 to store public keys, a private key, and other information required for secure messaging. The operating system, specific device applications or modules, or parts thereof, may be temporarily loaded into a volatile store, such as RAM 226 for faster operation. Moreover, received communication signals may also be temporarily stored to RAM 226 before permanently writing them to a file system located in the persistent store 224.

An exemplary application module 224N that may be loaded onto the dual-mode device 200 is a personal information manager (PIM) application providing PDA functionality, such as calendar events, appointments, and task items. This module 224N may also interact with the voice communication module 224A for managing phone calls, voice mails, etc., and may also interact with the data communication module 224B for managing e-mail communications and other data transmissions. Alternatively, all of the functionality of the voice communication module 224A and the data communication module 224B may be integrated into the PIM module.

The Flash memory 224 provides a file system to facilitate storage of PIM data items on the device. The PIM application may include the ability to send and receive data items, either by itself, or in conjunction with the voice and data communication modules 224A, 224B, via the wireless network 219. The PIM data items may be seamlessly integrated, synchronized and updated, via the wireless network 219, with a corresponding set of data items stored or associated with a host computer system, thereby creating a mirrored system for data items associated with a particular user.

The mobile device 200 may also be manually synchronized with a host system by placing the mobile device 200 in an interface cradle, which couples the serial port 230 of the mobile device 200 to the serial port of the host system. The serial port 230 may also be used to enable a user to set preferences through an external device or software application, to download other application modules 224N for installation, and to load Certs, keys and other information onto a device as described above. This wired download path may be used to load an encryption key onto the device, which is a more secure method than exchanging encryption information via the wireless network 219.

Additional application modules 224N may be loaded onto the mobile device 200 through the network 219, through an auxiliary I/O subsystem 228, through the serial port 230, through the short-range communications subsystem 240, or through any other suitable subsystem 242, and installed by a user in the Flash memory 224 or RAM 226. Such flexibility in application installation increases the functionality of the mobile device 200 and may provide enhanced on-device functions, communication-related functions, or both. For example, secure communication applications may enable electronic commerce functions and other such financial transactions to be performed using the mobile device 200.

When the mobile device 200 is operating in a data communication mode, a received signal, such as a text message or a web page download, will be processed by the transceiver 211 and provided to the microprocessor 238, which may further process the received signal for output to the display 222, or, alternatively, to an auxiliary I/O device 228. A received secure message would be processed as described above. A user of mobile device 200 may also compose data items, such as email messages, using the keyboard 232, which may be a complete alphanumeric keyboard laid out in the QWERTY style, although other styles of complete alphanumeric keyboards such as the known DVORAK style may also be used. User input to the mobile device 200 is further enhanced with a plurality of auxiliary I/O devices 228, which may include a thumbwheel input device, a touchpad, a variety of switches, a rocker input switch, etc. The composed data items input by the user may then be transmitted over the communication network 219 via the transceiver 211. Secure messages received by and to be transmitted from the mobile device 200 are processed by the data communication module 224B or an associated secure messaging software application according to the techniques described above.

When the mobile device 200 is operating in a voice communication mode, the overall operation of the mobile device 200 is substantially similar to the data mode, except that received signals are output to the speaker 234 and voice signals for transmission are generated by a microphone 236. Alternative voice or audio I/O subsystems, such as a voice message recording subsystem, may also be implemented on the mobile device 200. Although voice or audio signal output is accomplished primarily through the speaker 234, the display 222 may also be used to provide an indication of the identity of a calling party, the duration of a voice call, or other voice call related information. For example, the microprocessor 238, in conjunction with the voice communication module 224A and the operating system software, may detect the caller identification information of an incoming voice call and display it on the display 222.

A short-range communications subsystem 240 may also be included in the dual-mode device 200. For example, the subsystem 240 may include an infrared device and associated circuits and components, or a Bluetooth™ short-range wireless communication module to provide for communication with similarly enabled systems and devices.

It is claimed:

1. A method of indicating on an electronic device a security-related trust category associated with an electronic message, the method comprising:
 accessing security-related data associated with the electronic message, the security-related data indicating a cipher algorithm used with respect to encryption or signing of the electronic message; and
 accessing a security-related policy store on the electronic device, the security-related policy store containing associations between a plurality of security-related trust categories and cipher algorithms;
 determining, based upon the accessed security-related data, which of the security-related trust categories corresponds to the electronic message, the determining including comparing the security-related data of the electronic message with the associations in the policy store; and
 displaying a security-related indicator corresponding to the determined security-related trust category on a user interface of the electronic device,
 the security-related indicator indicative of trust including reliability strength of the cipher algorithm.

2. The method of claim 1, wherein the electronic device comprises a wireless mobile communication device, a cellular telephone, or a personal data assistant.

3. The method of claim 1, wherein at least one of the security-related trust categories is determined by an owner of the device.

4. The method of claim 1, wherein at least one of the security-related categories is determined by a user of the device.

5. The method of claim 1, wherein the security-related indicator includes text.

6. The method of claim 1, wherein the security-related data includes a digest or a digital signature.

7. The method of claim 1,
 wherein the electronic device and another electronic device are configured to use different security-related trust categories for the same security type.

8. The method of claim 1, wherein the electronic message is encrypted.

9. The method of claim 1, wherein the electronic message comprises an electronic mail message.

10. The method of claim 9, wherein a messaging client handles the electronic mail message.

11. The method of claim 1, wherein the security-related indicator comprises a graphical indicator.

12. The method of claim 11, further comprising providing a message in response to selection of the security-related indicator, the message to include details of at least one of a secure message protocol and the cipher algorithm used.

13. A non-transitory computer-readable storage medium that stores instructions for execution by one or more processors to perform operations for indicating on an electronic device a security-related trust category associated with an electronic message, the operations comprising:
 accessing security-related data associated with the electronic message, the security-related data indicating a cipher algorithm used with respect to encryption or signing of the electronic message; and
 accessing a security-related policy store on the electronic device, the security-related policy store containing associations between a plurality of security-related trust categories and cipher algorithms;
 determining, based upon the accessed security-related data, which of the security-related trust categories corresponds to the electronic message, the determining including comparing the security-related data of the electronic message with the associations in the policy store; and
 displaying a security-related indicator corresponding to the determined security-related trust category on a user interface of the electronic device,
 the security-related indicator indicative of trust including reliability strength of the cipher algorithm.

14. A system of indicating on an electronic device a security-related trust category associated with an electronic message, wherein security-related data indicates a cipher algorithm used with respect to encryption or signing of the electronic message, the system comprising:
 a security-related policy store configured to store, on the electronic device, associations between a plurality of security-related trust categories and cipher algorithms; and
 a comparator module configured to determine, based upon the accessed security-related data, which of the security-related trust categories corresponds to the electronic message by comparing the security-related data of the electronic message with the associations in the policy store; and
 a user interface to display a security-related indicator corresponding to the determined security-related trust category,
 wherein the security-related indicator is indicative of trust including reliability strength of the cipher algorithm.

15. The system of claim 14, wherein the user interface is configured to display a message in response to selection of the security-related indicator, the message to include details of at least one of a secure message protocol and the cipher algorithm used.

16. A system of indicating on an electronic device a security-related trust category associated with an electronic message, comprising:
 accessing security-related data associated with the electronic message, the security-related data indicating a cipher algorithm used with respect to encryption or signing of the electronic message; and
 means for accessing a security-related policy store on the electronic device, the security-related policy store containing associations between a plurality of security-related trust categories and cipher algorithms;
 means for determining, based upon the accessed security-related data, which of the security-related trust categories corresponds to the electronic message, the determining including comparing the security-related data of the electronic message with the associations in the policy store; and
 means for displaying a security-related indicator corresponding to the determined security-related trust category on a user interface of the electronic device,
 the security-related indicator indicative of trust including reliability strength of the cipher algorithm.

* * * * *

UNITED STATES PATENT AND TRADEMARK OFFICE
CERTIFICATE OF CORRECTION

| | | |
|---|---|---|
| PATENT NO. | : 8,347,089 B2 | Page 1 of 1 |
| APPLICATION NO. | : 12/697955 | |
| DATED | : January 1, 2013 | |
| INVENTOR(S) | : Adams et al. | |

It is certified that error appears in the above-identified patent and that said Letters Patent is hereby corrected as shown below:

On Title page 2, Item (56) in column 2, under "Other Publications", line 20, delete "al:" and insert --al.,--, therefor On Title page 2, Item (56) in column 2, under "Other Publications", line 20, delete "Formats'"" and insert --Formats",--, therefor On Title page 2, Item (56) in column 2, under "Other Publications", line 22, delete "B.:" and insert --B.,--, therefor On Title page 2, Item (56) in column 2, under "Other Publications", line 22-23, delete "Specification'"" and insert --Specification",--, therefor On Title page 2, Item (56) in column 2, under "Other Publications", line 24, delete "al.:" and insert --al.,--, therefor On Title page 2, Item (56) in column 2, under "Other Publications", line 26, before "International", insert --"--, therefor On Title page 2, Item (56) in column 2, under "Other Publications", line 28, delete "2004-11" and insert --2004", 11--, therefor On Title page 2, Item (56) in column 2, under "Other Publications", line 29, before "Notice", insert --"--, therefor On Title page 2, Item (56) in column 2, under "Other Publications", line 31, after "522855", insert --"--, therefor In the Claims In column 12, line 49, in Claim 16, after "message;", delete "and", therefor Signed and Sealed this
Twenty-second Day of April, 2014

Michelle K. Lee
*Deputy Director of the United States Patent and Trademark Office*